United States Patent
Ren et al.

(10) Patent No.: US 7,254,047 B2
(45) Date of Patent: Aug. 7, 2007

(54) POWER CONVERTERS HAVING OUTPUT CAPACITOR RESONANT WITH AUTOTRANSFORMER LEAKAGE INDUCTANCE

(75) Inventors: Yuancheng Ren, Blacksburg, VA (US); Julu Sun, Blacksburg, VA (US); Ming Xu, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 231 days.

(21) Appl. No.: 11/094,434

(22) Filed: Mar. 31, 2005

(65) Prior Publication Data

US 2006/0109696 A1 May 25, 2006

Related U.S. Application Data

(63) Continuation-in-part of application No. 10/992,227, filed on Nov. 19, 2004.

(51) Int. Cl.
*H02M 3/335* (2006.01)
(52) U.S. Cl. ..................... 363/21.14; 363/17
(58) Field of Classification Search ............... 323/271, 323/222, 282–287, 272; 363/17–20, 132, 363/16
See application file for complete search history.

(56) References Cited

U.S. PATENT DOCUMENTS

| 4,720,667 | A | * | 1/1988 | Lee et al. | 323/271 |
| 4,864,483 | A | * | 9/1989 | Divan | 363/37 |
| 5,255,174 | A | * | 10/1993 | Murugan | 363/17 |

\* cited by examiner

*Primary Examiner*—Rajnikant B. Patel
(74) *Attorney, Agent, or Firm*—Whitham Curtis Christofferson & Cook, P.C.

(57) ABSTRACT

Power converters having reduced body diode conduction loss, reduced reverse recovery loss and lower switching noise, among other benefits, have a resonant capacitor Cr connected across an unfiltered output. The resonant capacitor Cr resonates with the leakage inductance Lk of the transformer. The resonant capacitor and leakage inductance are selected such that ½ a LC resonance period is equal to an ON time of each secondary switch S1 S2. The resonance provides zero current switching for secondary switches S1 S2, eliminates zero body diode conduction during dead times, and eliminates reverse recovery losses in the secondary switches. The present invention is applicable to many different circuit topologies such as full bridge, active clamp forward, push-pull forward, and center-tap secondary. The present converters provide high energy conversion efficiency and high frequency operation.

23 Claims, 10 Drawing Sheets

POWER CONVERTERS HAVING OUTPUT CAPACITOR RESONANT WITH AUTOTRANSFORMER LEAKAGE INDUCTANCE

CROSS-REFERENCE TO RELATED APPLICATIONS

This application is a Continuation-in-part of U.S. patent application Ser. No. 10/992,227, filed Nov. 19, 2004, assigned to the assignee of the present invention and hereby fully incorporated by reference. Priority of that application is hereby claimed in regard to the subject matter which is common to that application.

FIELD OF THE INVENTION

The present invention relates generally to synchronous power converters. More particularly, the present invention relates to a family of power converters lacking an output inductor, and having a resonant output capacitor. The present converters have high power conversion efficiency.

BACKGROUND OF THE INVENTION

Synchronous power converters are widely used in computer and telecommunication electronics. Such power converters typically convert 48 volt bus power to lower voltages (e.g. 12V, 5V and 1.2V) needed for operating microprocessors and the like.

Modern electronics are decreasing in size and typically require increased operating current at lower voltages. As a result, power converters must provide more power while occupying less circuit board space. In order to meet these requirements, power converters must operate at higher frequencies. A high operating frequency allows for smaller passive components. However, high operating frequencies greatly increase body diode conduction losses, reverse recovery losses and switching losses. These losses must be reduced in order to increase the operating frequency of next-generation power converters.

Another problem with high frequency operation is switching noise. The reverse-recovery charge of the switches creates high voltage spikes. When high voltage spikes are present, switches tolerant of high voltages must be used. High voltage-rating switches typically have high ON-state resistance (Rds(on)) and therefore higher conduction loss. Hence, a reduction of the voltage spikes would allow the use of low voltage, low loss switches and would provide an increase in operating efficiency.

FIG. 1 shows a conventional power converter with a full bridge primary circuit 10 and a center-tapped secondary circuit 12. The secondary circuit has an output capacitor Co and an output inductor Lo. The output capacitor is as large as possible, with typical values of about 300 microfarads. A load (not shown) is connected across the output capacitor Co. FIG. 2 shows a timing diagram illustrating the typical operation of the circuit of FIG. 1. Horizontal lines indicate the ON times of switches Q1 Q2 Q3 Q4 S1 and S2. As illustrated, these switches are operated in two groups, Q2, Q3 and S2 and Q1, Q4 and S1, and the groups are operated in an alternating, generally complementary fashion. However, some so-called dead time 14 is provided between the on time of the respective groups to prevent shorting of $V_{in}$ or the secondary winding of the transformer. During dead times 14, the body diodes of secondary switches S1 S2 conduct current pulses 16 due to the inductance of the transformer and/or any output inductance which may be included in the power converter circuit, resulting in substantial energy loss and reverse recovery loss. Also, high voltage spikes 18 and ringing occur across the switches S1 S2. The body diode conduction loss and reverse recovery loss increase as operating frequency increases, and result in lower power conversion efficiency at higher switching frequencies.

It would be an advance in the art of power conversion to provide a power converter with reduced body diode conduction loss, reduced reverse recovery loss and reduced switching noise. Such circuits could operate at high frequency and have very small size because the higher frequency switching allows passive components of reduced size to be employed.

SUMMARY OF THE INVENTION

The present invention provides a power converter having a primary circuit and a secondary circuit coupled through a transformer. The primary circuit and secondary circuits each have at least one switch. The transformer has primary and secondary windings. The circuit has an inductance in series with either the primary winding or secondary winding. The inductance can be a leakage inductance of the transformer. A resonant capacitor is connected across an unfiltered output of the secondary circuit or may comprise the output capacitor. The resonant capacitor and inductance are resonant such that ½ of an LC resonant period is approximately equal to an ON time of the switch in the secondary circuit. This resonance results in a sinusoidal or nearly sinusoidal current pulse through the secondary switch.

The inductance may be a discrete inductor connected in series with the primary winding or secondary winding.

The secondary circuit may include an output inductor and output capacitor downstream of the resonant capacitor.

The primary circuit may be a half-bridge circuit, a full-bridge circuit, an active clamped forward circuit, a resonant-reset forward circuit, a push-pull circuit, and a push-pull forward circuit.

The secondary circuit may be a center-tapped circuit, or forward-type rectifier circuit.

The ON time of the secondary switch may be slightly shorter than ½ the LC resonant period. For example, the ON time of the secondary switch may be 0-10 nanoseconds shorter than ½ the LC resonant period. The ON time of the secondary switch may be within 10% of ½ the LC resonant period (e.g., preferably within ±10%, and more preferably within ±5%).

The transformer may have a magnetizing inductance large enough to provide zero voltage switching (ZVS) for the primary side switch. The magnetizing inductance provides ZVS by absorbing energy from the capacitance of the primary side switch.

In another embodiment of the present invention, the secondary switch is operable to have an ON time approximately equal to $\pi\sqrt{LkCr}$ (e.g., preferably within ±10% or more preferably within ±5%).

DETAILED DESCRIPTION OF THE PREFERRED EMBODIMENTS OF THE INVENTION

The present invention provides a power converter with reduced body diode conduction loss, reduced reverse recovery loss and reduced voltage spikes. Additionally, the present power converters can also have zero-voltage switching (ZVS) operation and reduced turn-off loss. The present power converters can operate at high frequencies (e.g. 1-2 Mhz), and can therefore have small passive components and high power density. The present power converters provide exceptionally high efficiency.

In a first embodiment of the present invention, the secondary circuit comprises a resonant capacitor. The resonant capacitor resonates with leakage inductance of the transformer. The resonant frequency is selected such that ½ of a LC resonant period is the same duration as an ON time of a secondary switch. The resonance between the resonant capacitor and leakage inductance produces a sinusoidal (or nearly sinusoidal) current pulse through the secondary switches. The sinusoidal pulse shape results in greatly reduced body diode conduction, reduces voltage spikes and ringing, reduces or eliminates reverse recovery loss, and reduces turn-off loss. Additionally, the present invention can provide zero voltage switching (ZVS) for all switching devices.

Figure 3:
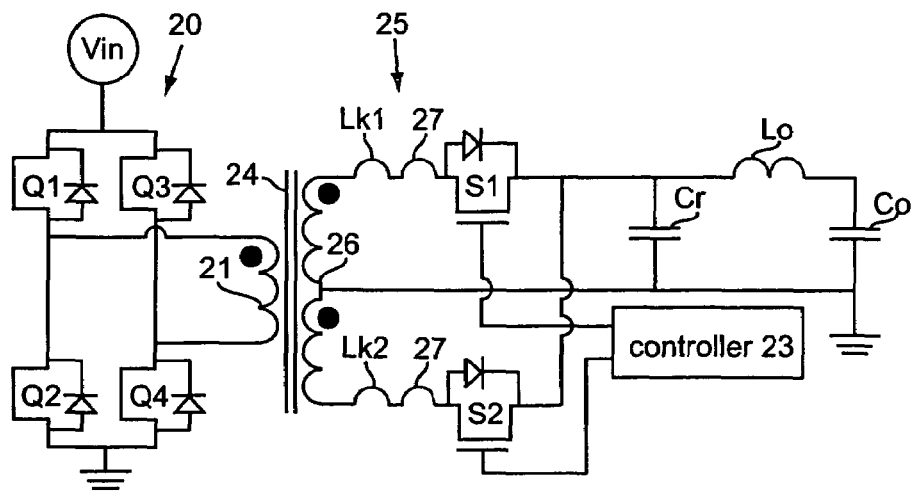
FIG. 3 shows a first embodiment of the present invention having a full bridge primary circuit and a center-tapped secondary circuit.

FIG. 3 illustrates a power converter circuit according to a first embodiment of the present invention. The converter has a full bridge primary circuit 20 comprising 4 switches Q1 Q2 Q3 Q4, and a center-tap secondary circuit 25 comprising two secondary switches S1 S2. A transformer 24 has a primary winding 21 and a center-tapped secondary winding 26. An optional output capacitor Co and an optional output inductor Lo are connected to the secondary circuit 25 and provide noise filtering. A load (not shown) is connected across the output capacitor Co. The converter has a switch controller 23 for controlling the secondary switches S1 S2.

The switches are preferably low on-resistance MOSFET switches, as known in the art. The transformer can be an integrated magnetic ferrite-core transformer, also well known in the art.

The transformer 24 necessarily includes leakage inductances Lk1 Lk2. The leakage inductances should have a known, predetermined value. The leakage inductances Lk1 Lk2 preferably have the same value. Also, it is well known that the leakage inductances Lk1 Lk2 are equivalently modeled in the primary circuit 20 or secondary circuit 25. For convenience, the leakage inductances Lk1 Lk2 are shown in the secondary circuit 25 of FIG. 3.

Significantly, the secondary circuit 25 includes a resonant capacitor Cr connected across an unfiltered output of the circuit (i.e. connected directly to secondary switches S1 S2). The resonant capacitor Cr and leakage inductances Lk1 Lk2 resonate and thereby shape the current pulses that travel through the secondary switches S1 S2. The resonant capacitor Cr capacitance and leakage inductances Lk1 Lk2 are selected so that they resonate at a specific frequency. If the leakage inductances Lk1 Lk2 of the transformer do not have high enough inductance, then separate, discrete inductors 27 can be added in series with the leakage inductances Lk1 Lk2. The discrete inductances 27 can be located in the primary circuit or in the secondary circuit.

Figure 4:
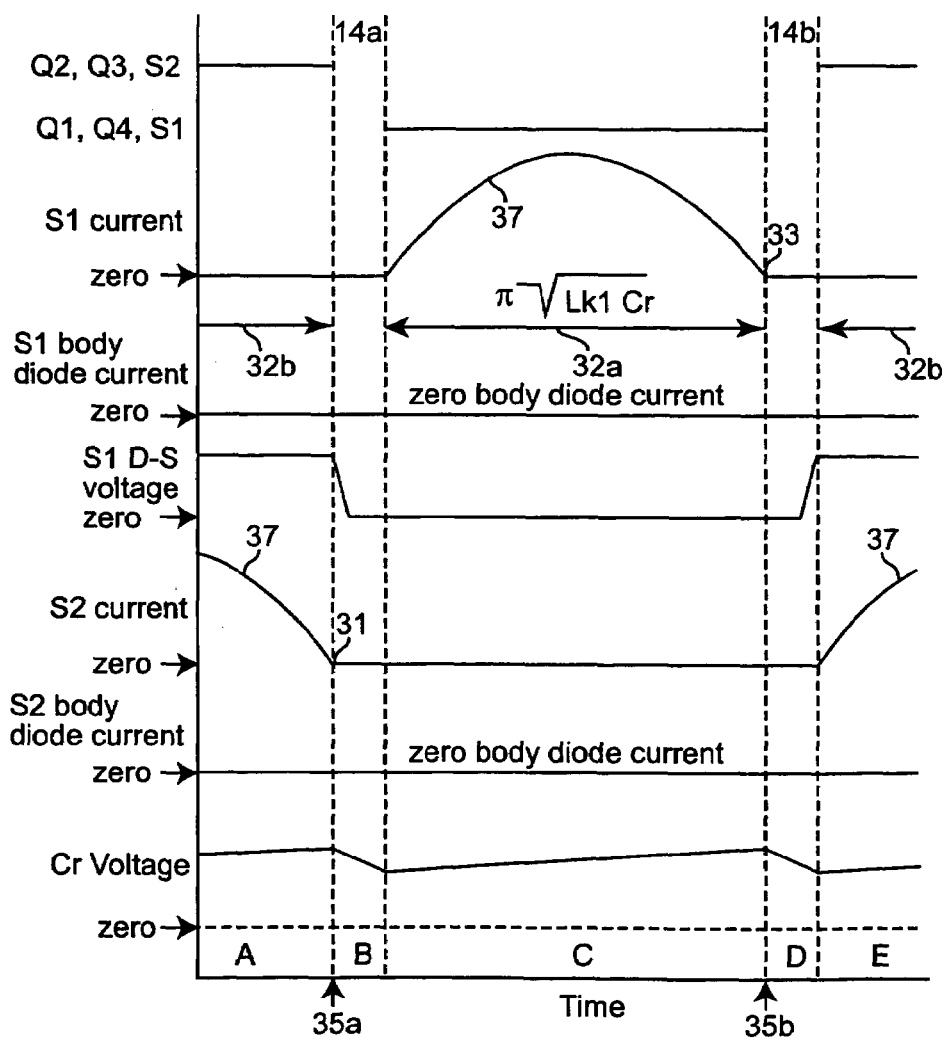
FIG. 4 shows a timing diagram illustrating the operation of the circuit of FIG. 3.

FIG. 4 shows a timing diagram illustrating the operation of the circuit of FIG. 3. Dark horizontal lines illustrate ON times of switches Q2, Q3, S2 and switches Q1 Q4 S1. A first dead time 14a and a second dead time 14b occur between ON times of switches Q2, Q3, S2 and Q1 Q4 S1. Switch S2 turns OFF at a first turn off time 35a (i.e. the beginning of first dead time 14a). Switch S1 turns OFF at a second turn off time 35b (i.e. the beginning of second dead time 14b). The S2 body diode current (during the first dead time 14a) is zero or very small because the switch S2 is turned OFF at a zero current crossing 31. Similarly, the S1 body diode current (during the second dead time 14b) is zero or very small because the switch S1 is turned OFF at a zero current crossing 33.

The leakage inductances Lk1 Lk2 and resonant capacitor Cr are selected to be resonant at a frequency approximately equal to the switching cycle frequency of each branch or phase of the power converter regardless of the number of branches or phases provided in the secondary side of the power converter so that ½ of an LC resonance period is approximately equal to (but does not exceed) an ON time 32a 32b of the respective secondary switches S1 S2. Expressed mathematically, the ON time 32a 32b of the secondary switches S1 S2 should be approximately equal to $\pi\sqrt{LkCr}$, where L is the inductance of each leakage inductance Lk1 Lk2 (in combination with the inductance of the discrete inductor 27, if present), respectively, and Cr is the capacitance of the resonant capacitor Cr. The resonance effect produces sinusoidal or nearly sinusoidal current pulses 37 through the switches S1 S2. Also, the resonant effect assures that the leakage inductances Lk1 Lk2 (and discrete inductors 27, if present) are discharged, or nearly discharged, at the turn off times 35a 35b (i.e. at the beginning of each dead time 14a 14b). Therefore, there will be zero or nearly zero current flowing through secondary switches S1

Figure 1:
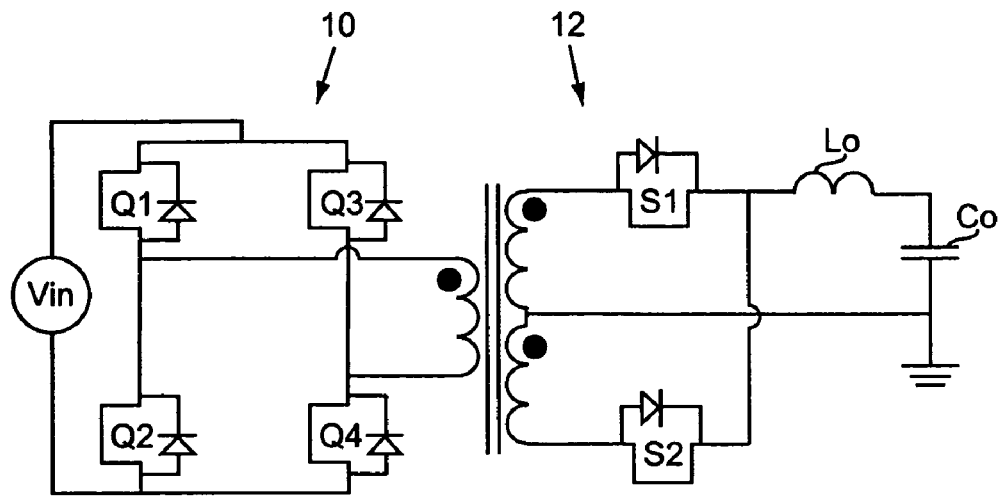
FIG. 1 (Prior Art) shows a conventional converter comprising a full bridge primary and center-tapped secondary circuit.
Figure 2:
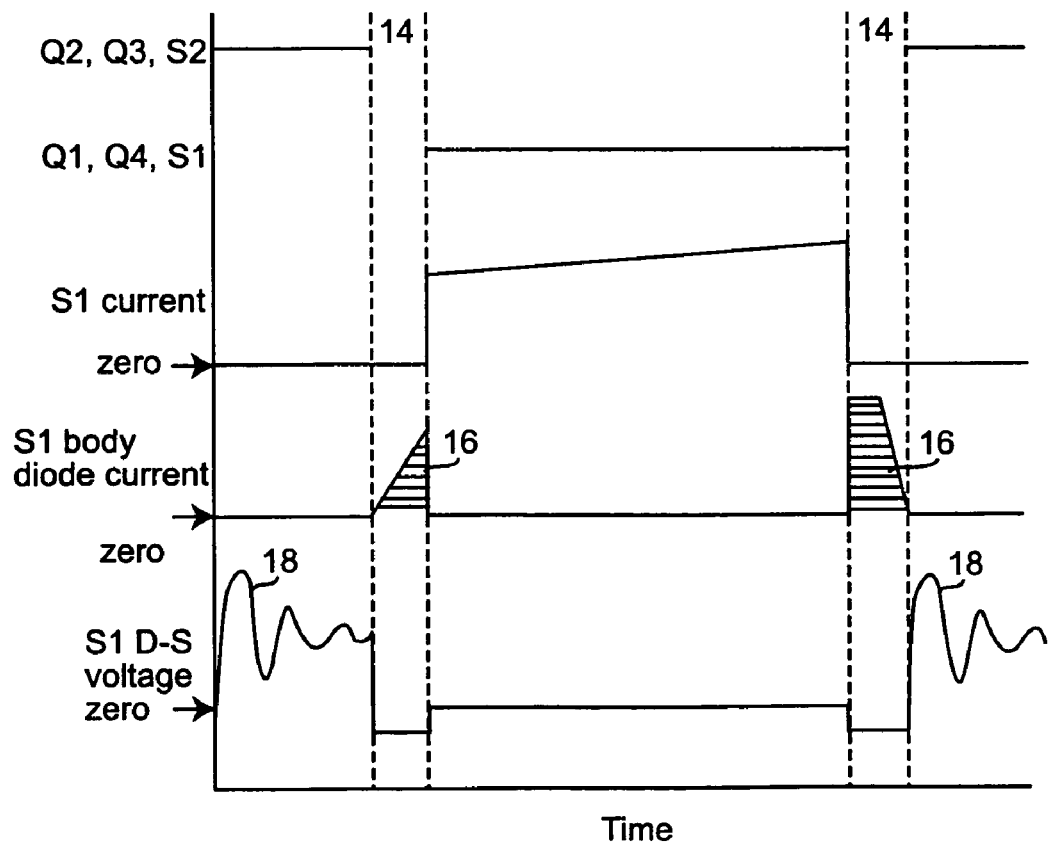
FIG. 2 (Prior Art) shows a timing diagram illustrating the operation of the circuit of FIG. 1, and undesirable body diode conduction and high voltage spikes.

S2 at turn off and during the dead times 14a 14b. It should be noted that the resonance thus developed causes the peak current of the sinusoid or near-sinusoid to be greater than the amplitude of the substantially rectangular current pulse developed by the circuit of FIG. 1, as illustrated by the S1 current waveform in FIG. 2. However the integral of the sinusoid or near-sinusoid is substantially equal to the integral of the rectangular current pulse, indicating that substantially the same amount of charge is delivered by each sinusoid or near-sinusoid current pulse indicating that there is little, if any, efficiency penalty due to the resonance while increased efficiency and other meritorious effects and advantages are achieved. For example, the zero current turn off condition for switches S1 S2 results in zero or nearly zero body diode conduction, and zero or nearly zero reverse recovery loss. Hence, power conversion efficiency is greatly improved.

Preferably, the leakage inductances Lk1 Lk2 are equal. If they are not equal, then the ON times 32a 32b of switches S1 S2 can be different so that the ON times 32a 32b each match ½ the resonant period ($\pi\sqrt{LkCr}$) for each leakage inductance Lk1 Lk2. For example, if leakage inductance Lk1 is larger than Lk2, then switch S1 can have a longer ON time than switch S2.

Figure 5A:
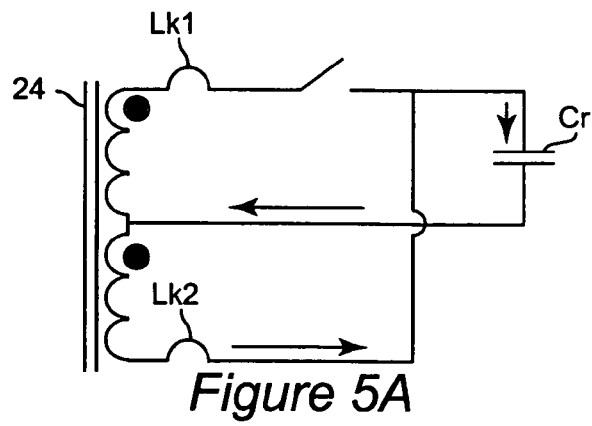
FIGS. 5A, 5B, 5C, 5D and 5E illustrate circuit conditions during time periods A, B, C, D, and E illustrated in FIG. 4.

The timing diagram of FIG. 4 is divided into 5 time periods: A, B, C, D, and E. FIGS. 5A, 5B, 5C, 5D and 5E illustrate secondary circuit conditions within the circuit of FIG. 3 during the time periods A, B, C, D, and E, respectively:

FIG. 5A: Switch S2 is ON. Current through S2 drops as leakage inductance Lk2 discharges and resonant capacitor Cr becomes charged.

Figure 5B:
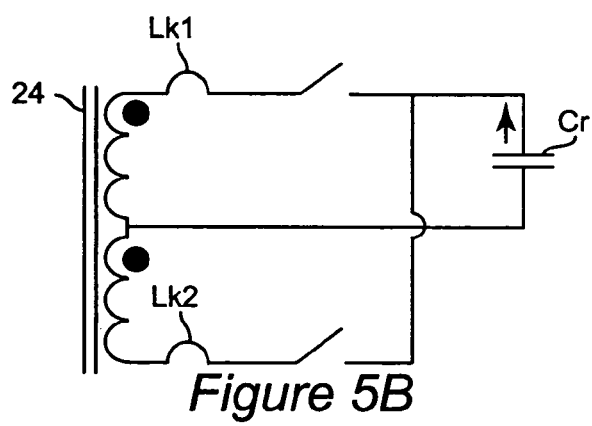

FIG. 5B: Switch S2 turns OFF at the zero current crossing 31 of the S2 current. During the first dead time 14a, there is no freewheeling current and therefore no body diode conduction through switch S2. Resonant capacitor Cr discharges through output inductor Lo.

Figure 5C:
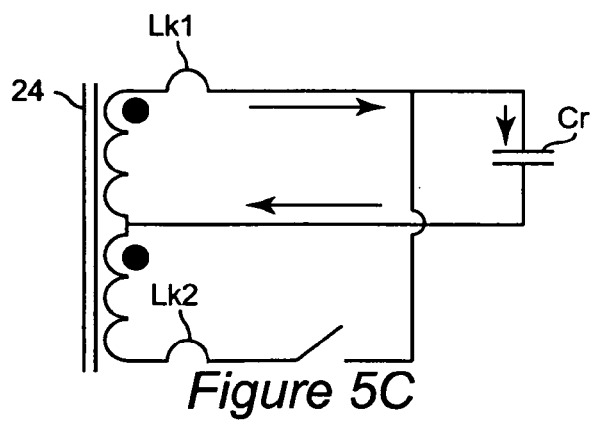

FIG. 5C: Switch S1 turns ON and current through switch S1 rises gradually as leakage inductance Lk1 is charged. Current through switch S1 drops and resonant capacitor Cr becomes charged.

Figure 5D:
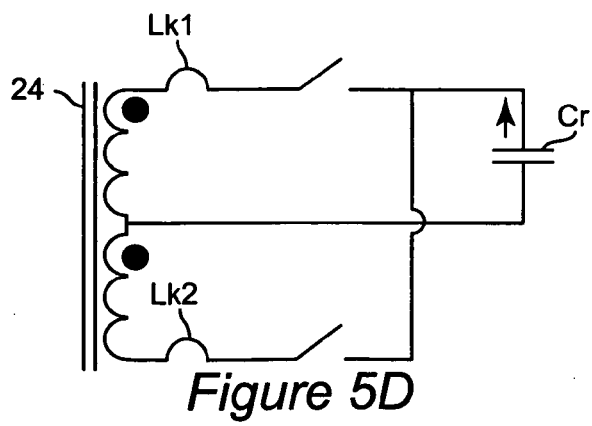

FIG. 5D: Switch S2 turns OFF at the zero crossing 33 of the S1 current. During the second dead time 14b, there is no freewheeling current and therefore no body diode conduction through switch S1. Resonant capacitor Cr discharges through output inductor Lo.

Figure 5E:
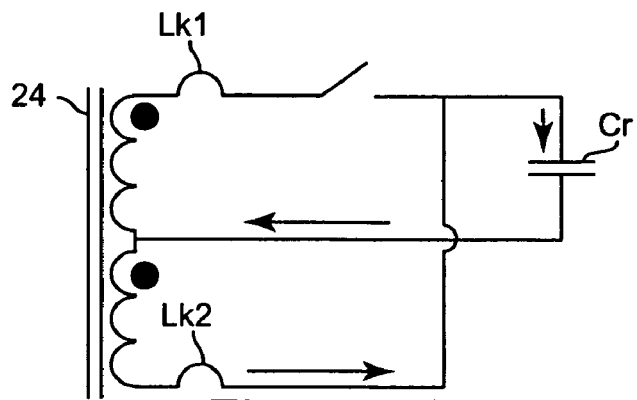

FIG. 5E: Switch S2 turns ON and current through switch S2 rises gradually as leakage inductance Lk2 is charged.

In typical power converter circuits, the leakage inductances Lk1 Lk2 will typically have inductance values of about 3-7 nanohenries. For operation at frequencies in the range of about 1-2 Mhz, the resonant capacitor can have values in the range of about 1-20 microfarads, for example.

The voltage on the resonant capacitor is illustrated in FIG. 4. The voltage on the resonant capacitor Cr is essentially a DC voltage with a small AC ripple voltage imposed. The average voltage on the resonant capacitor Cr will be approximately Vin/N, where Vin is the input voltage, and N is the turns ratio of the transformer 24. The resonant capacitor Cr provides current to the output inductor Lo during the dead times 14a 14b. The resonant capacitor Cr is charged when either secondary switch S1 or S2 is ON.

It is important to note that the drain-source (D-S) voltage across switches S1 S2 does not experience high voltage spikes 18 in the present invention. This is because the switches S1 S2 experience zero current (or near zero current) at turn-off times 35a 35b. Zero current at turn-off times 35a 35b greatly reduces the amount of high voltage spikes and noise. Consequently, the present invention permits the use of switches (primary side Q1 Q2 Q3 Q4 and secondary side S1 S2 switches) having a lower voltage rating, and therefore lower ON-state resistance (Rds(on)). Employing switches with low ON-state resistance substantially increases the power conversion efficiency. Hence, the low current at turn-off times 35a 35b contributes to increased power conversion efficiency.

Figure 6:
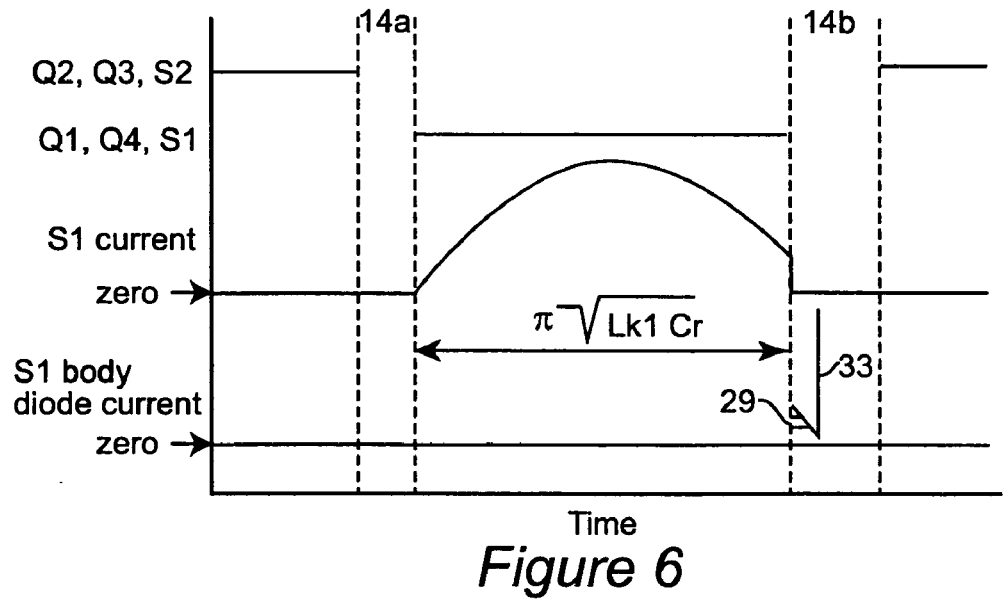
FIG. 6 illustrates a small amount of body diode conduction that occurs when switches are turned off slightly early.

FIG. 6 illustrates an alternative embodiment in which the switches Q1 Q4 and S1 turn off early, i.e. before the zero current crossing 33. In this case, there will be a small amount of body diode current 29. The amount of body diode current 29 will increase with earlier turn off of switches Q1 Q4 and S1. Therefore, in order to minimize body diode conduction, avoid reverse recovery loss and increase efficiency, the switches Q1 Q4 and S1 should turn off as close to the zero current crossing 33 as possible. Turning off switches too early will excessively increase body diode conduction, and will greatly increase reverse recovery loss. Of course, the same considerations apply to switches Q2 Q3 and S2.

It is highly undesirable to turn off switches S1 S2 after the zero current crossings 31 33. If switches S1 S2 are ON after the zero current crossings 31 33, then a current reversal will occur (i.e., current will reverse direction and flow backwards through the secondary switches S1 S2). A current reversal will tend to greatly reduce operating efficiency because the reversed energy flow will be completely wasted in the primary side circuit 20. By comparison, body diode conduction wastes only a portion of energy passing through a body diode. Hence, late turn off of switches S1 S2 tends to reduce operating efficiency more than early turn off of switches S1 S2.

Therefore, in view of unavoidable timing errors and jitter, it is generally preferred in the present invention to operate the circuit with a slightly early turn off of switches S1 S2 and small body diode conduction. A slightly early turn off will assure that a current reversal does not occur even in the event of small timing errors. The secondary switches S1 S2 can be turned off up to 10 or 20 nanoseconds early, for example.

The present invention is capable of providing zero voltage switching (ZVS) for all the switches Q1 Q2 Q3 Q4 S1 S2. A particular and substantial advantage of the invention is that ZVS can be provided for any load condition. No matter how much energy is drawn by the load, ZVS for all the switches can be assured.

By comparison, prior art converter circuits (e.g. the circuit of FIG. 1) typically provide ZVS for only a specific load condition. This is because, in the prior art converter circuits, the energy stored in the leakage inductors Lk1 Lk2 is used to provide ZVS.

Figure 7:
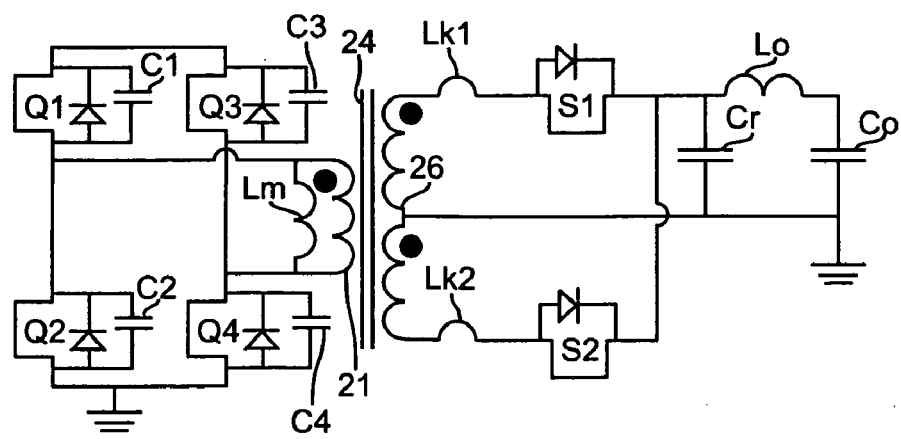
FIG. 7 illustrates the effect of transformer magnetizing inductance on zero voltage switching capability.

FIG. 7 illustrates how load-independent ZVS is provided in the present invention. The transformer 24 intrinsically has magnetizing inductance Lm in parallel with the transformer primary 21. The primary switches Q1 Q2 Q3 Q4 each have junction capacitors C1 C2 C3 C4, as well known in the art. During the dead times 14a 14b the magnetizing inductance Lm draws current from junction capacitors C1 C2 C3 C4 so that they are completely discharged, or nearly discharged at turn on. In order to provide this effect, the magnetizing inductance Lm of the transformer 24 must be able to store all the energy of the four capacitors C1 C2 C3 C4. This requires a relatively small magnetizing inductance Lm because a smaller magnetizing inductance Lm will conduct more current, and thereby store more energy than a large magnetizing inductance. This effect is independent of the load. Hence, the present invention will provide load-independent ZVS for the primary side switches if the magnetizing inductance Lm has a small enough value.

Specifically, in order to provide ZVS, the magnetizing inductance should satisfy the following relationship:

$$\tfrac{1}{2}(L_m I_{pk}^2) \geq 4*(\tfrac{1}{2}(CV_{in}^2))$$

where Lm is the magnetizing inductance, Ipk is the peak magnetizing inductance current (which occurs during the dead times 14a 14b), C is the capacitance of the junction capacitors C1 C2 C3 C4 (assumed to be equal), and Vin is the input voltage. The left hand side of the relation represents the energy storage capacity of the magnetizing inductance, and the right hand side of the relation represents the energy storage capacity of the junction capacitors C1 C2 C3 C4.

Figure 8:
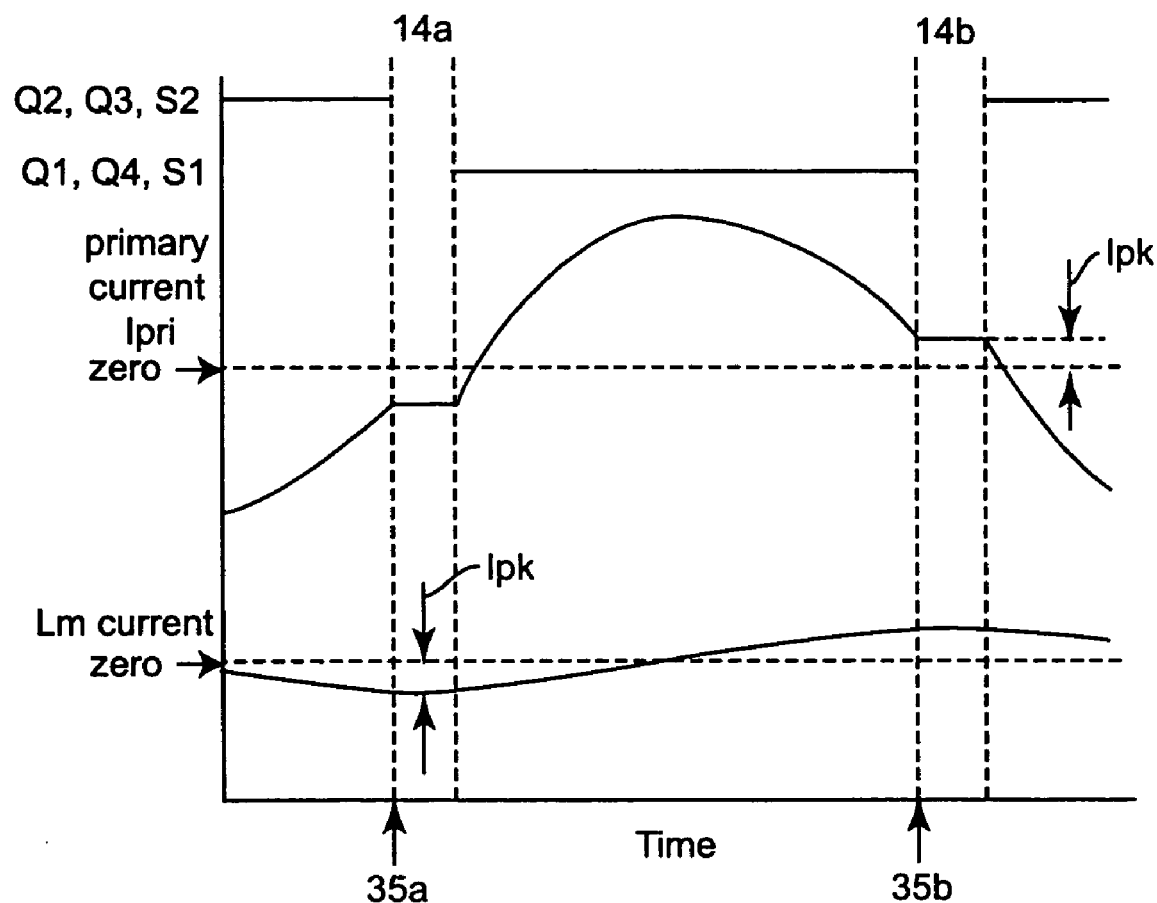
FIG. 8 shows a timing diagram illustrating the current in the primary winding and the magnetizing current Im associated with the magnetizing inductance of the transformer.

Another advantage of the present invention is that turn off loss of the primary switches Q1 Q2 Q3 Q4 can be greatly reduced. Turn off loss is approximately proportional to current in the primary winding 21 at the turn off times 35a 35b. In the present invention, the primary winding current is relatively small at the turn off times 35a 35b, and hence the turn off loss is small. FIG. 8 shows a timing diagram illustrating the primary winding current Ipri and magnetizing inductance current (Lm current). The primary current Ipri rises and falls in the same manner as the current flowing through the secondary switches S1 S2. The magnetizing inductance Lm current is superimposed on the primary current Ipri. At the turn off times 35a 35b, the only current flowing through the primary winding 21 is the peak magnetizing current Ipk, which is associated with the magnetizing inductance Lm. Since the peak magnetizing current Ipk is relatively small (compared to the total primary winding current) at the turn off times 35a 35b, the turn off loss is relatively small.

The peak magnetizing current Ipk, and hence the turn off loss, is reduced by large values of magnetizing inductance Lm. Therefore, in order to reduce the turn off loss, the magnetizing inductance should have a relatively large value.

As noted above, load-independent ZVS requires a small value for magnetizing inductance Lm. Therefore, the magnetizing inductance value Lm should be selected to be small enough to provide ZVS, but still large enough to provide relatively small turn off loss. The advantages of load-independent ZVS and advantages of small turn off loss must be balanced in the converter design. Properly selecting the value of magnetizing inductance will provide a converter with both low turn off loss, and load-independent ZVS operation. For typical converter circuits operating at about 1 Mhz, the transformer can have a magnetizing inductance in the range of about 3000-7000 nanohenries.

It should be appreciated that all of the above advantages of the present invention derive, directly or indirectly from resonance with the leakage inductance which provides the sinusoidal or near-sinusoidal half wave current waveform from each branch or phase of the power converter. This resonance can be provided with other circuit topologies and among components present in the circuit for other purposes. For example, the leakage inductance of an autotransformer (with or without additional inductance, as discussed above) can be directly resonated with the output filter capacitor Co, as illustrated in the exemplary non-isolated, inductorless soft-switching resonant buck converter circuit of FIG. 9. The autotransformer also avoids isolation of the load from the input voltage source to provide a non-isolated power converter for applications where the isolation provided by a transformer as in the circuits of FIGS. 3, 7 or 13-18 may be undesirable.

Figure 9:
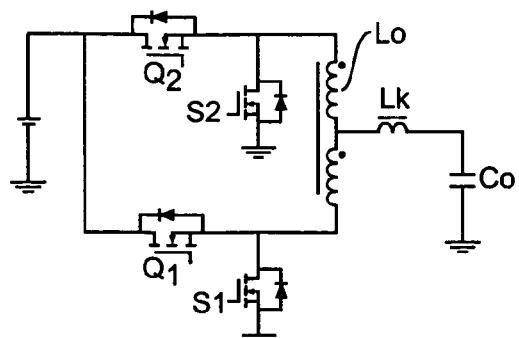
FIG. 9 is a schematic diagram of a second embodiment of the invention.

Only two branches or phases are shown in FIG. 9 for clarity but as many phases as desired may be provided. In the power converter circuit of FIG. 9, each branch includes a control switch (sometimes referred to as a top switch) Q1 or Q2 and a so-called bottom switch S1 or S2, respectively the bottom switches S1, S2 provide a current return path in each branch or phase while the corresponding control switch Q1, Q2 of each respective branch is off. These switches are also grouped and operated in a generally complementary fashion but with dead time periods and optional early turn off as discussed above. The outputs of the respective branches or phases is provided to respective coils of an autotransformer $L_0$ from which output current is drawn at a connected center tap to an output filter capacitor $C_0$. As discussed above, the leakage inductance can be equivalently modeled at different circuit points but, for convenience, is shown in the output connection from the autotransformer center tap to output filter capacitor $C_0$. The required value of $C_0$ for an allowable level of ripple voltage can be reduced by the provision of additional branches or phases and/or rendered generally less important by provision of one or more further voltage conversion regulation stages (in which case, the complete power converter would be substantially identical to the embodiment of FIG. 18 as discussed below) and thus the LC resonance may be achieved using a value of $C_0$ generally comparable to the value of Cr discussed above and which can be provided in a very small discrete component, particularly at high switching frequencies. Alternatively, additional inductance can be provided, as discussed above.

Figure 10A:
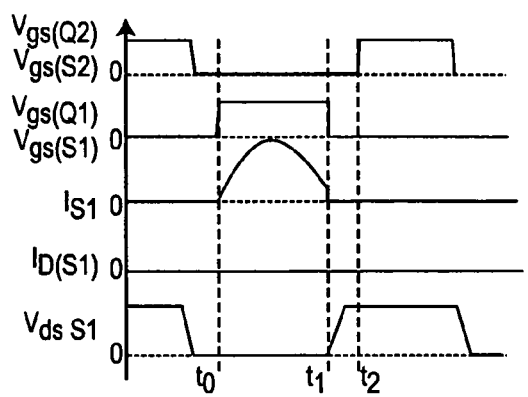
FIGS. 10A, 10B, 10C, 10D and 10E illustrate key waveforms of the embodiment of FIG. 9, simulated and experimental.
Figure 10B:
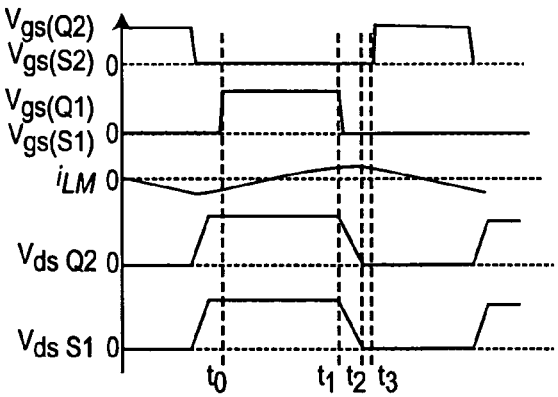
Figure 10C:
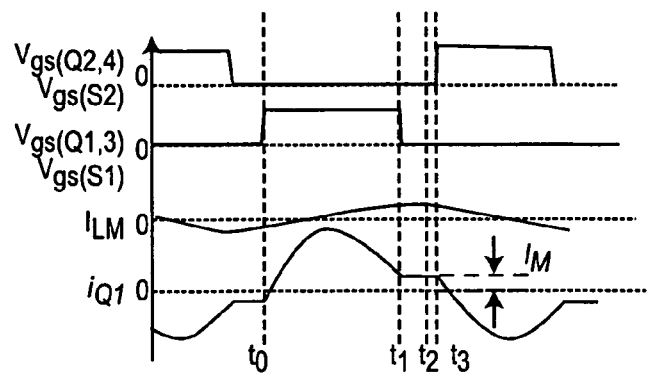
Figure 10D:
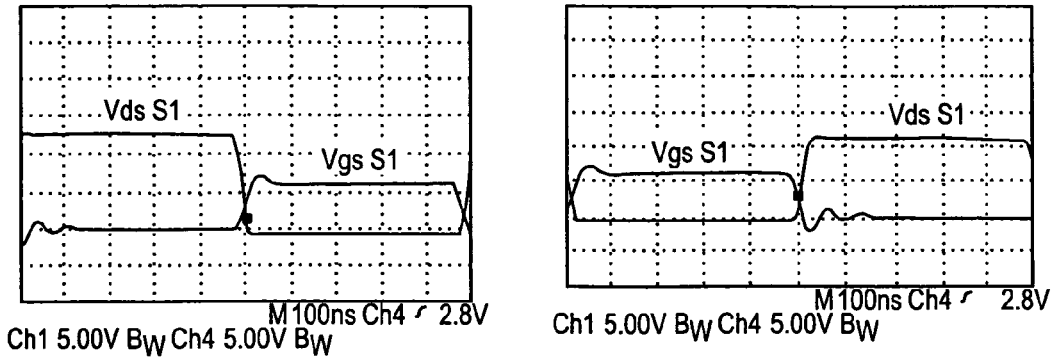
Figure 10E:
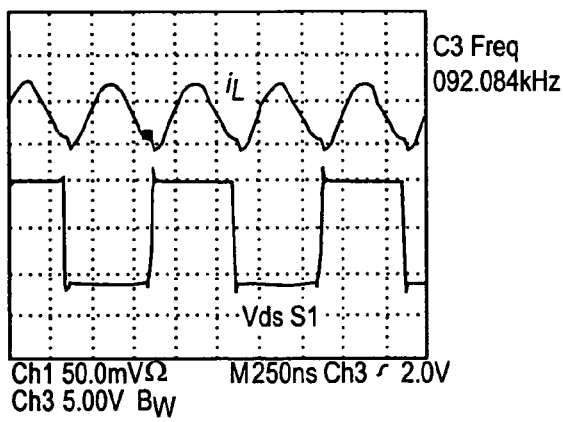
Figure 10F:
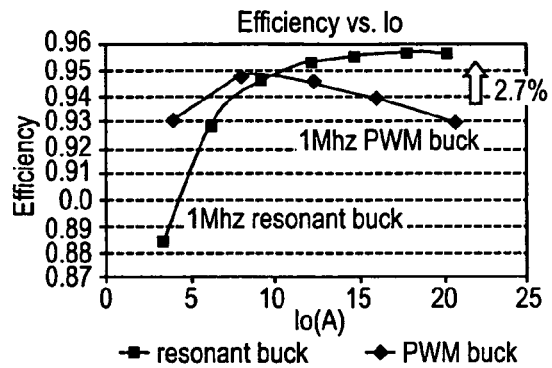
FIG. 10F is a graphical comparison of the efficiency of the embodiment of FIG. 9 with a corresponding conventional PWM buck converter.

FIGS. 10A, 10B and 10C respectively illustrate key waveforms of the circuit of FIG. 9. In particular, FIG. 10A shows that no body diode conduction current, $I_{D(S1)}$ occurs (e.g. prior to $t_0$ or subsequent to $t_1$) while $I_{S1}$ exhibits a near-sinusoidal half-wave shape (including early turn-off to improve operating margins, as discussed above). These waveforms are substantially identical to corresponding waveforms illustrated in FIGS. 4 and 8. Experimental results of drain-source voltage waveforms across S1 based on a prototype circuit in accordance with FIG. 9 are illustrated in FIG. 10D and verify that not body diode conduction occurs. FIG. 10B illustrates that zero voltage switching can be achieved for all switches in the circuit of FIG. 9 and FIG. 10C illustrates that reduced turn-off losses can also be achieved. Experimental results shown in FIG. 10 verify that turn-off currents resulting from early turn-off can be small while providing good operating margins. Again, it is only necessary to provide turn-off prior to the half-wave near-sinusoid current waveform is exceeded and turn-off current may be made arbitrarily small depending on the variation of pulse width modulated drive signals for the switches. The prototype from which the experimental results of FIGS. 10D and 10E were derived was operated at a switching frequency of 1 MHz and, compared to a conventional, hard switching buck converter, the footprint of the prototype converter achieved a 33% reduction in area and the prototype achieved a power density increase by a factor in excess of 2.5, as shown in FIG. 10F.

Figure 11:
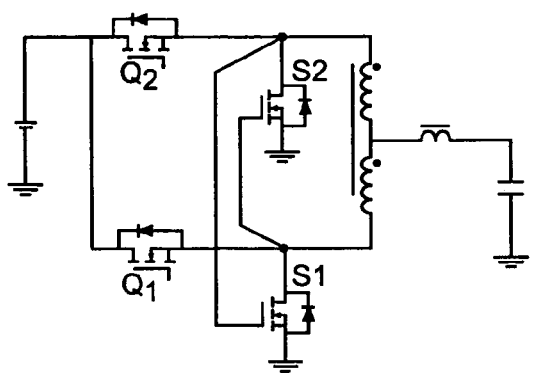
FIG. 11 illustrates an embodiment of the invention including a self-driven arrangement applied to the embodiment of FIG. 9.
Figure 12:
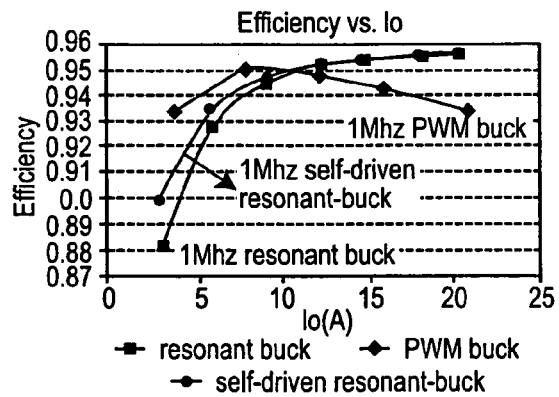
FIG. 12 is a graphical comparison of the efficiency of the embodiment of FIG. 11 superimposed on the comparison illustrated in FIG. 10F.

As a perfecting feature of the embodiment of the invention shown in FIG. 9, a self-driven arrangement can be provided for S1 and S2 as illustrated in FIG. 11. Essentially each bottom switch of respective branches or phases (regardless of the number of branches or phases provided), receives a control signal from the node connecting the output of the control switch and the output of the bottom switch of the preceding phase. The finite response time of the output of each control switch and the half-wave, near sinusoid current output of each bottom switch thus provides a finite dead time between respective phases and the performance is adaptive to variation in switching frequency. As shown in FIG. 12, additional efficiency is derived from the power converter using the self-driven arrangement of FIG. 11.

The present invention includes many circuit topologies other than the full bridge/center tapped circuit of FIG. 3. The resonant capacitor Cr can be included in many different kinds of converter circuits to provide the advantages described herein: reduced body diode conduction, reduced reverse recovery loss, load-independent ZVS for all switches, reduced switching noise, and reduced turn off loss. In particular, the resonant capacitor of the present invention can be used with primary circuits such as the half-bridge, push-pull, push-pull forward, active-clamped forward, and resonant reset forward, in combination with secondary circuits such as center-tapped rectifier and forward-type rectifier.

Figure 13:
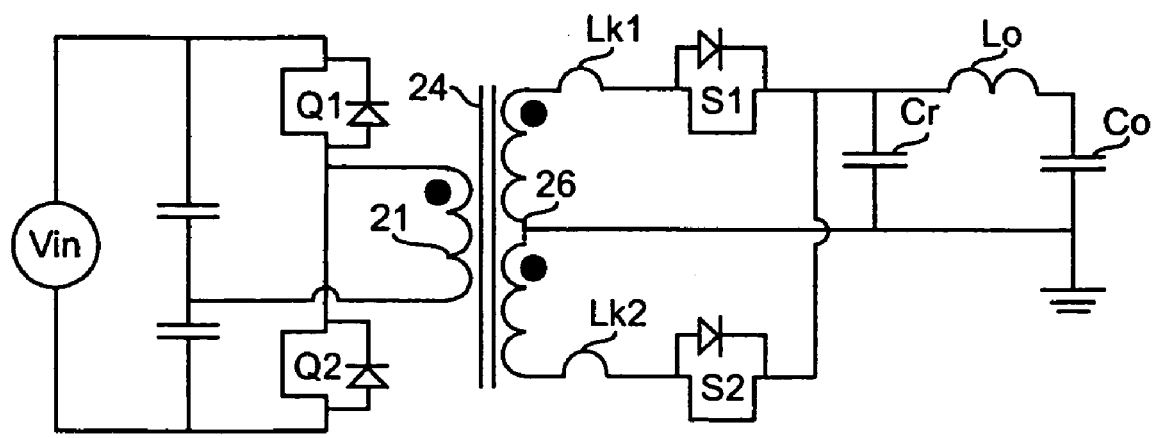
FIGS. 13, 14, 15, 16 and 17 illustrate alternative embodiments of the present invention with various primary circuits.

FIG. 13, for example, shows a converter with a half bridge primary circuit and center-tapped secondary circuit according to the present invention.

Figure 14:
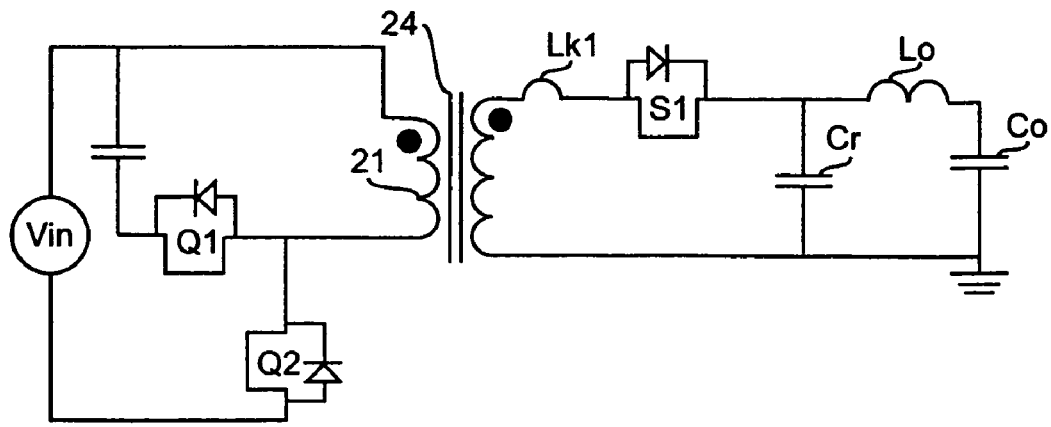

FIG. 14 shows a converter with an active-clamp forward primary circuit and forward rectifier secondary circuit according to the present invention.

Figure 15:
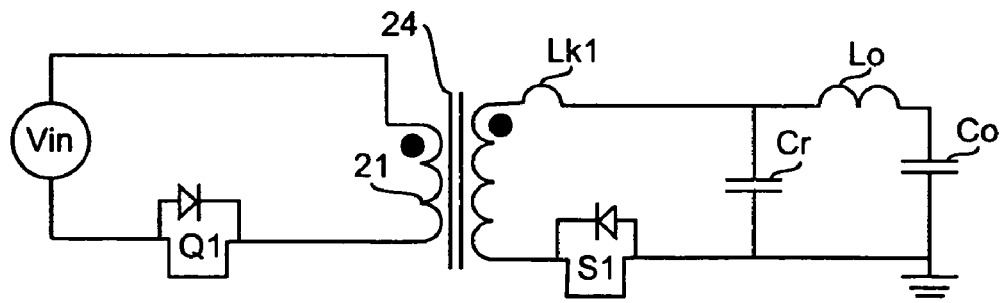
Figure 16:
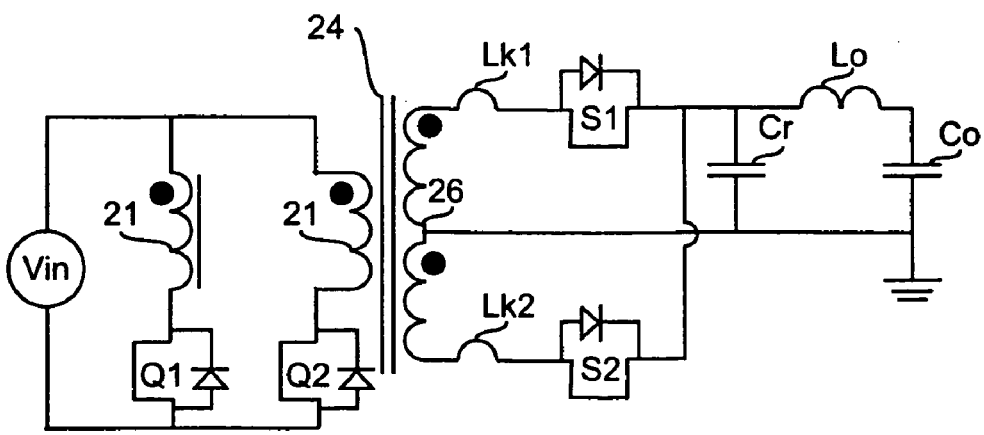

FIG. 15 shows a converter with a resonant-reset forward primary circuit and forward rectifier secondary circuit according to the present invention FIG. 16 shows a converter with a push-pull primary circuit and center-tapped secondary circuit according to the present invention.

Figure 17:
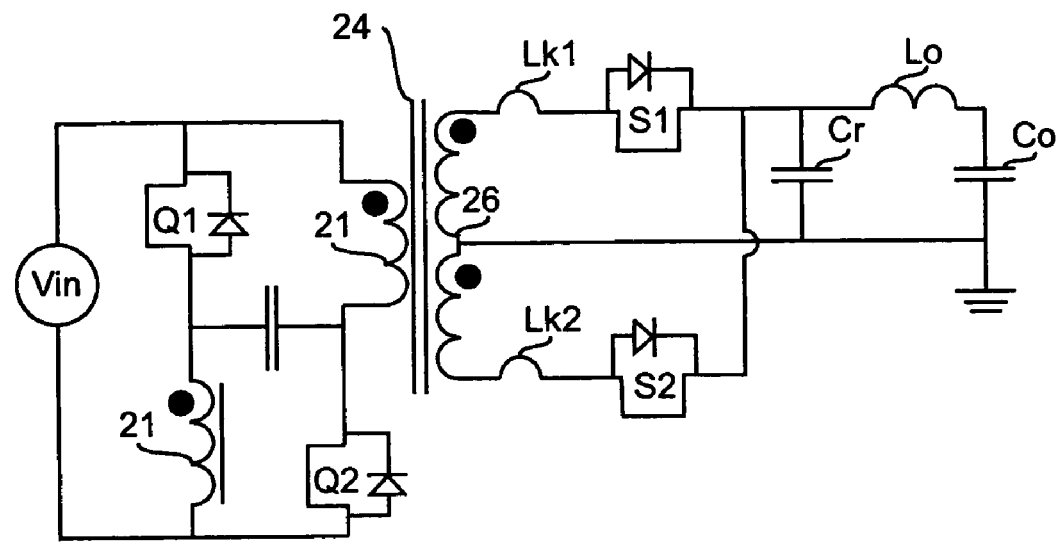

FIG. 17 shows a converter with a push-pull forward primary circuit and center-tapped secondary circuit according to the present invention.

The circuits of FIGS. 13-17 all have a resonant capacitor Cr (or, correspondingly, $C_O$ as in FIG. 9 or 11) and can all provide the advantages of reduced body diode conduction, reduced reverse recovery loss, load-independent ZVS for all switches, reduced switching noise, and reduced turn off loss.

It is noted that the circuits of FIGS. 13-17 can alternatively illustrate the leakage inductance Lk in series with the primary winding 21. The leakage inductance Lk is intrinsic to the transformer and can be considered to be within either the primary circuit or secondary circuit. This characteristic of the leakage inductance Lk is well known in the art.

Figure 18:
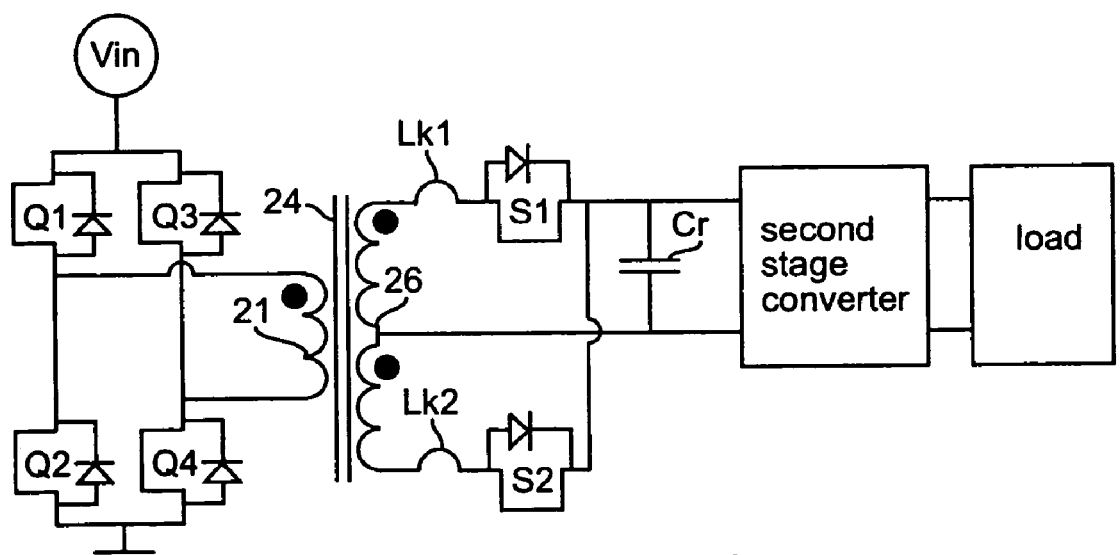
FIG. 18 shows a power converter in accordance with the invention in combination with a second stage converter.

FIG. 18 illustrates another embodiment of the invention in which the output inductor Lo and output capacitor Co are absent. A second stage converter 50 is connected downstream of the resonant capacitor Cr. The second stage converter can be a buck converter or any other non-isolated DC/DC converter. With a second state converter, typically no output inductor or output capacitor is necessary because the inductance (and, optionally, capacitance) of the second stage converter provides filtering of the power provided to the load.

The present invention can provide converters with exceptionally high power conversion efficiency in the range of about 96-98%. Typically, the present power converters provide a 5-6% boost in power conversion efficiency compared to similar conventional converters lacking the resonant capacitor. Additional efficiency gains at lower load levels and improved switch synchronization are achieved by using a self-driven arrangement as shown in FIGS. 11 and 12.

It will be clear to one skilled in the art that the above embodiment may be altered in many ways without departing from the scope of the invention. Accordingly, the scope of the invention should be determined by the following claims and their legal equivalents.

What is claimed is:

1. A power converter, comprising:
   a) a primary circuit including at least one switch;
   b) a secondary circuit including at least one switch;
   c) an autotransformer exhibiting an inductance; and
   d) an output capacitor of a value to be resonant with said inductance, wherein the capacitor and inductance are resonant such that ½ of an LC resonant period is approximately equal to an ON time of the switch in the secondary circuit.

2. The power converter of claim 1 wherein the inductance is a leakage inductance of said autotransformer.

3. The power converter of claim 1 further comprising a discrete inductor separate from the autotransformer, wherein the discrete inductor is connected in series with a primary winding or secondary winding and inductance of said discrete inductor and said autotransformer resonant with said capacitor.

4. The power converter of claim 1 further comprising an output inductor and output capacitor downstream of the resonant capacitor.

5. The power converter of claim 1 wherein the primary circuit comprises a circuit selected from the group consisting of a half-bridge circuit, a full-bridge circuit, an active clamped forward circuit, a resonant-reset forward circuit, a push-pull circuit, and a push-pull forward circuit.

6. The power converter of claim 1 wherein the secondary circuit comprises a circuit selected from the group consisting of center-tapped circuit or forward rectifier circuit.

7. The power converter of claim 1 further comprising a second stage converter downstream of the output capacitor.

8. The power converter of claim 1 wherein the ON time of the secondary switch is 0-10 nanoseconds shorter than ½ the LC resonant period.

9. The power converter of claim 1 wherein the autotransformer has a magnetizing inductance, and wherein the magnetizing inductance is small enough to provide ZVS for the primary side switch.

10. The power converter of claim 1 wherein the ON time of the secondary switch is within 10% of ½ the LC resonant period.

11. The power converter of claim 1, further including a self-driven arrangement for controlling said at least one switch of said secondary circuit.

12. A power converter, comprising:
   a) a primary circuit including at least one primary switch;
   b) a secondary circuit including at least one secondary switch;
   c) an autotransformer exhibiting an inductance wherein the inductance has an inductance value Lk;
   d) an output capacitor connected to be resonant with said inductance wherein the output capacitor has a capacitance value Cr; and wherein the secondary switch is operable to have an ON time approximately equal to $\pi \sqrt{LkCr}$.

13. The power converter of claim 12 wherein the inductance is a leakage inductance of the autotransformer.

14. The power converter of claim 12 further comprising a discrete inductor separate from the autotransformer, wherein the discrete inductor is connected in series with a primary winding or secondary winding.

15. The power converter of claim 12 further comprising an output inductor and output capacitor downstream of the resonant capacitor.

16. The power converter of claim 12 wherein the primary circuit comprises a circuit selected from the group consisting of a half-bridge circuit, a full-bridge circuit, an active clamped forward circuit, a resonant-reset forward circuit, a push-pull circuit, and a push-pull forward circuit.

17. The power converter of claim 12 wherein the secondary circuit comprises a circuit selected from the group consisting of center-tapped circuit or forward rectifier circuit.

18. The power converter of claim 12 further comprising a second stage converter downstream of the output capacitor.

19. The power converter of claim 12 wherein the ON time of the secondary switch is 0-10 nanoseconds shorter than $\pi\sqrt{LkCr}$.

20. The power converter of claim 12 wherein the ON time of the secondary switch is within 10% of $\pi\sqrt{LkCr}$.

21. The power converter of claim 12 wherein the autotransformer has a magnetizing inductance, and wherein the magnetizing inductance is small enough to provide ZVS for the primary side switch.

22. The power converter of claim 12, further including a self-driven arrangement for controlling said at least one switch of said secondary circuit.

23. A method of operating a power converter including a switch, an autotransformer and a load capacitor, said method including steps of resonating an inductance of said autotransformer with said load capacitor at a resonant frequency, and setting a switching cycle frequency of said switch at approximately said resonant frequency.

* * * * *